United States Patent [19]
Vilain

[11] Patent Number: 5,461,669
[45] Date of Patent: Oct. 24, 1995

[54] TELECOMMUNICATION NETWORK WITH SEPARATE CALL CONTROL AND CONNECTION CONTROL

[75] Inventor: Bernard Vilain, Lannion, France

[73] Assignee: Alcatel N.V., Amsterdam, Netherlands

[21] Appl. No.: 102,993

[22] Filed: Jul. 28, 1993

[30] Foreign Application Priority Data

Jul. 29, 1992 [FR] France ................................ 92 09393

[51] Int. Cl.⁶ .................................................. H04M 3/56
[52] U.S. Cl. ........................... 379/350; 379/94; 379/269; 379/220; 379/242; 370/60.1; 370/85.11; 370/110.1; 370/94.3
[58] Field of Search ............................. 379/350, 94, 269, 379/220, 58, 242; 370/60.1, 85.11, 92, 58.1, 58.2, 58.3, 62, 110.1, 85.13, 94.3

[56] References Cited

U.S. PATENT DOCUMENTS 5,195,086 3/1993 Baumgartner et al. ................... 370/62

OTHER PUBLICATIONS

Ballard, M. et al, "Digital Cellular Mobile–Radio System ECR900", *European Transactions on Telecommunications and Related Technologies*, vol. 1, No. 1, Jan. 1990, Milano Italy, pp. 17–30.

Gaddis, Mike et al, "Connection Managment for a Prototype Fast Packet ATM B–ISDM Network", *Proceedings the National Communication Forum*, vol. 44, Oct. 8, 1990 Oak brook, Ill., pp. 601–608.

Kung, R., Key Design Issues in the Intellligent Network, *ICIN*, Mar. 14, 1989, Bordeaux, France pp. 99–107.

French Search Report FR 9209393 dated Apr. 8, 1993.

Int Switching Symposium 1990, Session C10, Paper #5 vol. 6, May 28, 1990 pp. 187–193 [Grenzhauser et al.].

*Primary Examiner*—Jeffery A. Hofsass
*Assistant Examiner*—Jacques M. Saint-Surin
*Attorney, Agent, or Firm*—Sughrue, Mion, Zinn, Macpeak & Seas

[57] ABSTRACT

A telecommunication network in which call control and connection control are separated comprises switching nodes each comprising a call and service control point implementing all signalling functions relating to call control and service control including: call set-up, supervision and clearing down and the same functions in respect of at least one service requested during a call. The network also comprises a bearer control point connected to the call and service control point and implementing only switching functions and signalling functions relating to connection control including: bearer set-up, supervision and clearing down.

4 Claims, 4 Drawing Sheets

TELECOMMUNICATION NETWORK WITH SEPARATE CALL CONTROL AND CONNECTION CONTROL

BACKGROUND OF THE INVENTION

1. Field of the Invention

The invention concerns a telecommunication network with separate call control and connection control.

In what follows, the expression "call control" refers to all network functions which process requests for service sent by a subscriber. Thus call control has an overview of all the resources of a switching node that will be required to set up a call. The expression "connection control" refers to all functions required to set up connections: setting up, supervising and clearing down the connections supporting a call. Thus connection control includes switching functions and routing functions.

2. Description of the Prior Art

In a known model of the narrowband integrated services digital network (ISDN) call control and connection control are not separated: setting up a call involves simultaneous connection control and call control. A model has been developed for a first set of intelligent network services. This model does not call into question the narrowband ISDN model but rather adds to it a service control model for controlling the narrowband ISDN model during certain call phases.

This model added to the narrowband ISDN model is used in the mobile radio network described in French patent application n° 2 638 307, for example. In this network a switching center includes a service switching point implementing only voice and data switching functions and a mobile radio control point implementing only signalling functions concerned with mobile radio subscriber mobility (roaming). Mobile radio subscriber call control is therefore effected in the switch which is a conventional switching center part of which is used to connect fixed subscriber terminals.

A model for broadband basic services has been developed. This model is based on the principle of separating call control and connection control. It therefore differs fundamentally from the model of the intelligent network added to the model of the narrowband ISDN. The multimedia call concept makes it essential to distinguish between call control and connection control because call set-up may be followed by the setting up of multiple connections which may vary during the same call. A broadband call may be conveyed by a unidirectional connection and subsequently by a bidirectional connection, for example, or its bandwidth may change depending on the services requested during one and the same call.

The model of the broadband network for basic services is inadequate for multiparticipant calls and for processing sophisticated services such as multimedia services.

An object of the invention is to propose a telecommunication network able to support sophisticated services including broadband sophisticated services.

SUMMARY OF THE INVENTION

The invention consists in a telecommunication network in which call control and connection control are separated, the network comprising switching nodes each comprising:

a call and service control point implementing all signalling functions relating to call control and service control including: call set-up, supervision and clearing down and the same functions in respect of at least one service requested during said call; and a bearer control point connected to the call and service control point and implementing only switching functions and signalling functions relating to connection control including: bearer set-up, supervision and clearing down.

The invention will be better understood and other details of the invention will emerge from the following description and the appended drawings.

DETAILED DESCRIPTION OF THE INVENTION

Figure 1:
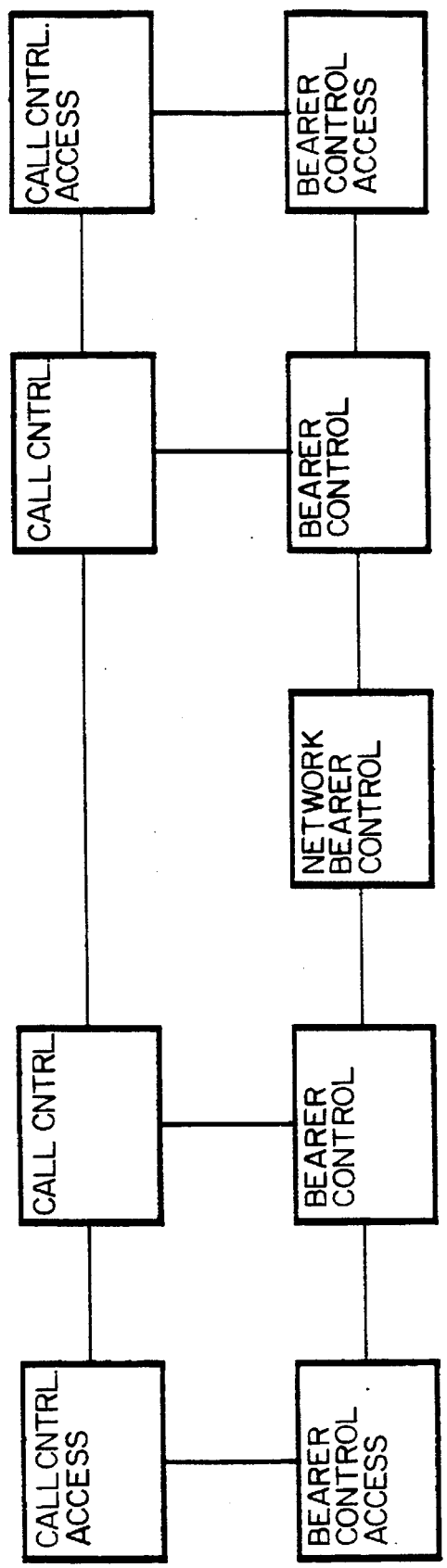
FIG. 1 shows the known model for a broadband network providing basic services.

Referring to FIG. 1, the known model of a broadband network providing basic services comprises a higher layer called the call control layer and a lower layer called the connection control layer. The connection control layer comprises:

in the customer premises equipment, a bearer control agent (BCA) unit;

in each customer access node, a bearer control (BC) unit; and in intermediate network nodes, network bearer control (NBC) units implementing the transit function.

This connection control layer implements the following functions: virtual channel or switchpath setup; connection resource management; connection routing control (virtual channels or switchpaths); connection utilization and congestion supervision; transfer of signalling from the call control layer.

The call control layer comprises:

in the customer premises equipment, a call control agent (CCA) unit;

in each customer access node or intermediate node, a call control (CC) unit.

The call control layer handles overall call control including: call set-up and clearing down; supplementary services; call routing. It also handles virtual channel control, including: authorization to connection control layer to set up and clear down virtual channels, correlation between a call and one or more virtual channels; management of call states associated with calls; transfer of signalling, in particular for the supplementary services; user-to-user signalling.

This model is not fully finalized at this time and is inadequate for multiparticipant calls and for processing sophisticated services.

Figure 2:
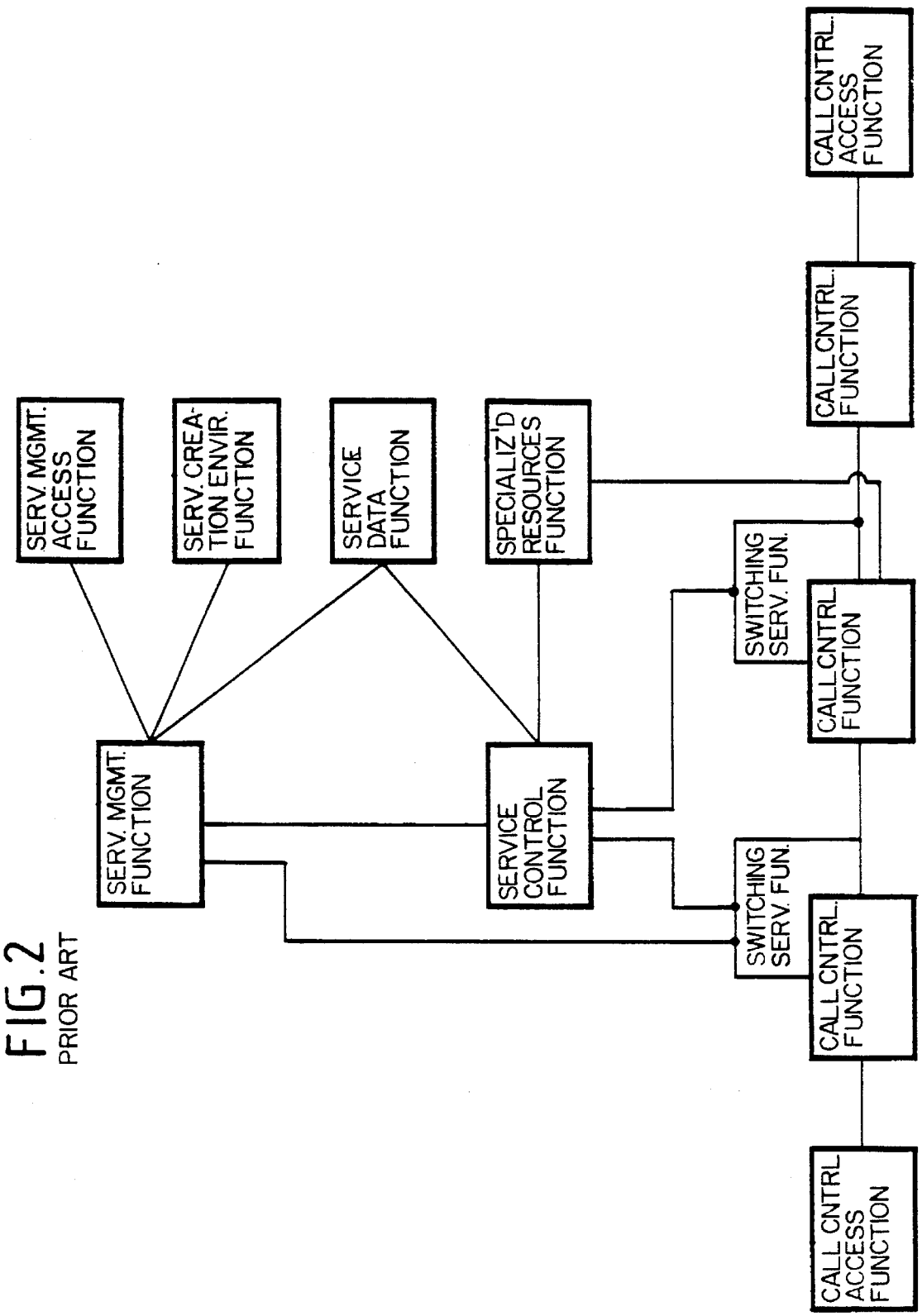
FIG. 2 shows the known model for an intelligent network added to a narrowband ISDN.

FIG. 2 shows the known model for an intelligent network added to a narrowband integrated services digital network. This model has a lower layer whose functions are the conventional call control functions of a narrowband ISDN and an upper layer controlling the provision of services and managing these services.

The upper layer comprises network management units common to all of the network: a service management functions (SMF) unit; a service management access functions (SMAF) unit; a service creation environment functions (SCEF) unit; a service control functions (SCF) unit which interacts with a specialized resources functions (SRF) unit and a service data functions (SDF) unit.

Each customer premises equipment comprises a call control access functions (CCAF) unit which is an interface between the subscriber and the network call control functions. It implements the following functions:

it provides the subscriber with call or service instance access, maintenance, modification and release;

it accesses the service capabilities of the call control functions (CCF) of a node using service requests for setting up, manipulating and clearing down a call or a service instance;

it receives information relating to a call or a service from a CCF unit of a node and retransmits it to the subscriber; and it updates service request status information.

Each network node comprises a call control functions (CCF) unit which implements the following functions:

it sets up, manipulates and clears down call or connection instances at the request of the CCAF unit;

it enables association and interconnection of functional entities of the units which are involved in a particular call or a connection instance;

it manages relations between CCAF entities involved in a call;

it provides trigger mechanisms for access to functions of the intelligent network, for example it transmits events to a node switching server functions (SSF) unit of a node; and its functions relating to the intelligent network are managed and updated by the service management functions (SMF) unit.

Each node comprises a switching server functions (SSF) unit which in association with the CCF unit provides the functions required for interaction between the CCF and SCF units. These functions are:

recognition of events triggering service control for interaction with the service control functions (SCF) unit;

management of signalling between the CCF unit and the SCF unit; and modification of connection control functions in the CCF unit for processing service requests under the control of the SCF unit.

The SSF unit is managed and updated by the SMF unit.

The service control functions (SCF) unit controls the call control functions: it can interact with other units to obtain information needed to process a call or a service. These functions are:

it interacts with the SSF, SRF and SDF units;

it provides the logic and the processing capacity required for services provided by the intelligent network;

it interacts with other SCF units as necessary; and it is managed and updated by the service management functions (SMF) unit.

The service data functions (SDF) unit contains network and subscriber data accessible in real time to the SCF units for executing intelligent network services. These functions are:

it interacts with the SCF unit; and it is managed and updated by the service management functions (SMF) unit.

The specialized resource functions (SRF) unit provides the specialized resources needed to execute some intelligent network services including digit receivers, recorded announcements and conference call points. These functions are:

it interacts with the SCF and CCF units;

it is managed and updated by the service management functions (SMF) unit;

it may provide logic and processing capacity for receiving and sending information to and from subscribers; and it can implement a function similar to that of the call control functions (CCF) unit for managing connections supporting specialized resources.

The service creation environment functions (SCEF) unit is used to define, develop and test new services and to transfer them to the SMF unit.

The service management access functions (SMAF) unit provides an interface between service managers and the service management functions (SMF) unit.

The SMF unit deploys and provides intelligent network services. For a given service it coordinates different instances of the SCF and SDF units.

Note the difference in approach between the intelligent network model and the broadband network model. The former models a vertical relationship between the SSF and SCF layers and this leads to the specification of an intelligent network interface between these two layers. The latter, on the other hand, emphasizes relationships between peer entities in the conventional protocol sense: this means a horizontal relationship between the CCA and CC units of the call control layer, on the one hand, and a horizontal relationship between the BCA, BC and NBC units of the connection control layer, on the other hand.

Figure 3:
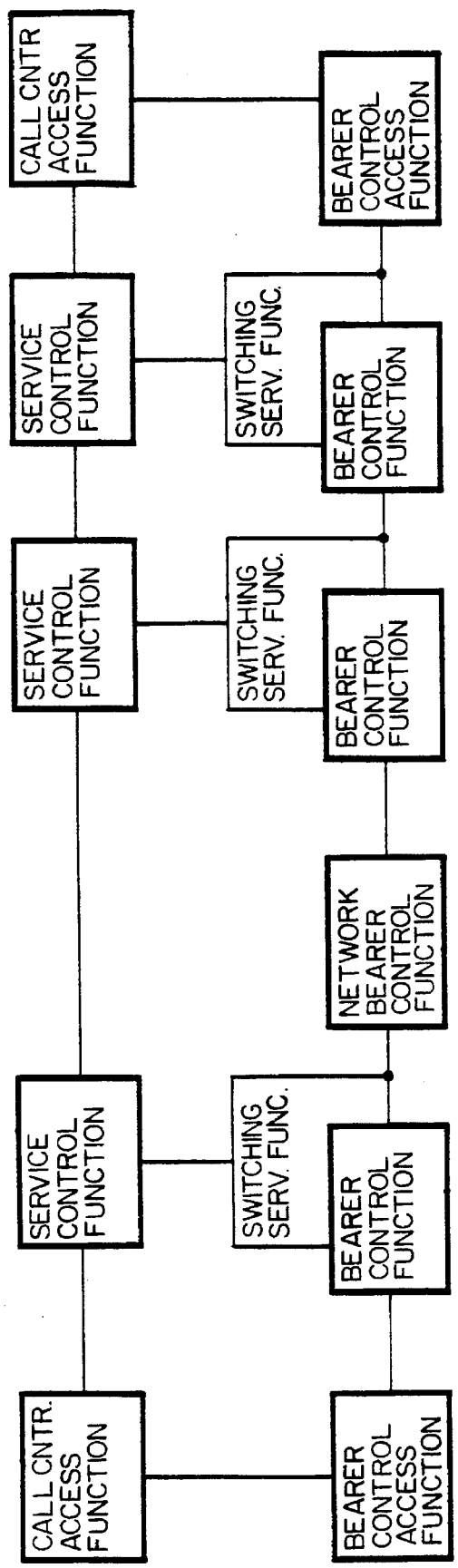
FIG. 3 shows the model of a network in accordance with the invention.

FIG. 3 shows the model of a telecommunication network in accordance with the invention. In the upper or call control layer each user equipment comprises a call control access functions (CCAF) unit and each node comprises a service control functions (SCF) unit. In the lower or call control layer each user equipment comprises a bearer control agent functions (BCAF) unit and each customer access node comprises a bearer control functions (BCF) unit to which is added a switching server functions (SSF) unit. The intermediate nodes comprise a network bearer control functions (NBCF) unit providing the transit service.

The call control access functions (CCAF) unit implements the functions described previously for the CCA unit in FIG. 1. The BCAF unit implements the following functions:

it manages resources for the bearer connection elements on the subscriber to network access side in cooperation with the adjoining BCF units and at the request of the CCAF units;

it connects and disconnects the bearer resources on the access side; and it manages the configuration of resources on the access side.

The network bearer control functions (NBCF) unit implements the following functions:

it manages bearer resources on the network side in collaboration with the bearer control functions (BCF) units;

it relays network bearer connections in collaboration with the adjoining BCF units; and it manages the configuration of resources on the network side.

Figure 4:
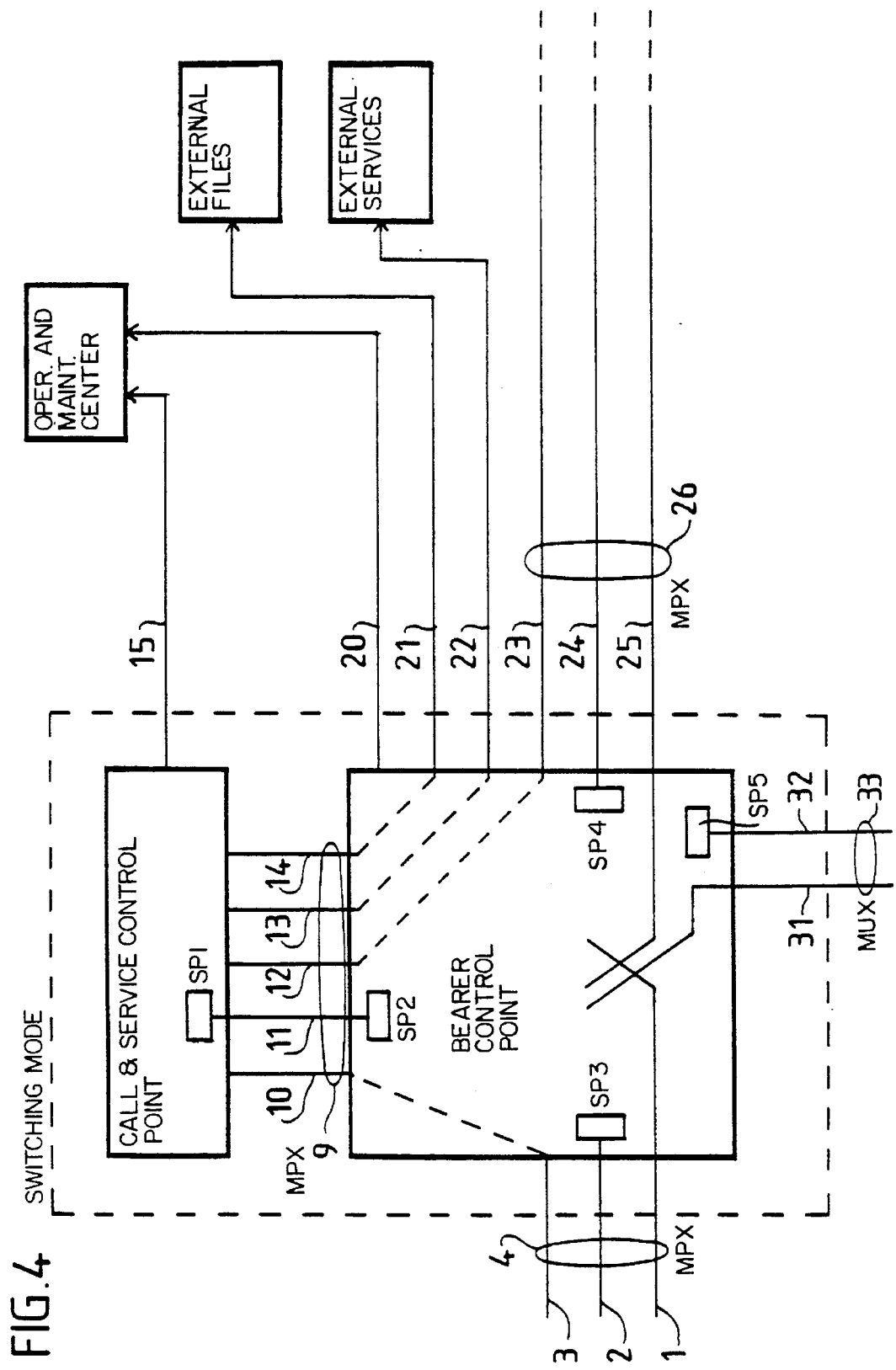
FIG. 4 shows the block diagram of one embodiment of a switching node of a network in accordance with the invention.

FIG. 4 shows the block diagram of one embodiment of a switching node of a telecommunication network in accordance with the invention constituting a subscriber local office or a transit switching center. It comprises a call and service control point and a switch called the bearer control point. These two entities may be colocated or separately located. The bearer control point implements the functions of the BC unit previously described with reference to FIG. 1. It provides a set of physical or logical resources relating to levels 1 through 3 of the ISO model. It can provide any type of bearer including virtual circuits operating in asynchronous transfer mode.

The call and service control point implements the functions of the SCF unit previously described with reference to FIG. 2 and those of the CC unit described with reference to FIG. 1. It handles only signalling relating to call and service control, including: call set-up, supervision and clearing down and the same functions in respect of a service or services used during the call.

Call set-up comprises: analyzing information contained in a service request sent by a requester in the form of numbers or alphanumeric characters or in the form of an indicated subscriber category such as a direct line; translation into another number as required, for the toll-free service, for example; determination of a routing number defining a geographical direction; and determination of charging data.

Call supervision consists in detecting events originating from the calling or called party or from the technical status of the network and possibly leading to a change in the logical status of the call, for example a supplementary service request or a request to terminate service, or failure of a multiplex supporting the call.

The bearer control point implements the functions of the SSF and BCF units described previously with reference to FIG. 3, i.e. only switching and signalling functions relating to bearer control, including: bearer set-up, supervision and clearing down on the basis of information supplied by the call and service control point or by peer bearer control points.

The bearer control point is connected by a multiplex 4 to a subscriber or to another node of the telecommunication network. The multiplex 4 comprises:

a voice and data link 1; and a bearer control signalling link 2 and a call control signalling link 3 served by subscriber signalling or CCITT N° 7 signalling, as appropriate.

The bearer control point is connected by a multiplex 26 to another node of the telecommunication network. The multiplex 26 comprises:

a voice and data link 25; and a bearer control signalling link 24 and a call control signalling link 23, both served by CCITT N° 7 signalling.

The links 1 and 25 are connected by a temporary connection set up by the bearer control point. The links 2 and 24 terminate at signalling points SP3 and SP4 of the bearer control point.

The call and service control point is connected to the bearer control point by a multiplex 9 comprising:

a call control signalling link 10 connected to the link 3 by a semi-permanent connection set up by the bearer control point;

a bearer remote control signalling link 11 connecting signalling points SP1 and SP2 respectively in the call and service control point and in the bearer control point;

a call control signalling link 12 connected to the link 23 by a semi-permanent connection set up by the bearer control point;

a service external control signalling link 13 connected to the link 22 by a semi-permanent connection set up by the bearer control point; and an external file signalling link 14 connected to the link 21 by a semi-permanent link set up by the bearer control point.

The signalling points SP1 and SP2 use the standard intelligent network interface with the addition of parameters relating to connections requested by the call and service control point: unidirectional, bidirectional, symmetrical, asymmetrical connection, point-to-point broadcast, bandwidth or any allowed combination of the above features.

The call and service control point and the bearer control point are respectively connected by links 15 and 20 to a national operation and maintenance center (OMC) providing administration and maintenance functions concerning calls and services, including charging, and to the bearer physical resources deployed. Splitting the two types of information flow provides the possibility of using them in the standard hierarchy for standard telecommunication management networks (CCITT Recommendation M.30, Annex A). The bearer control point is further connected:

by a link 22 to an external services server external to the switching node; and by a link 21 to files external to the switching node.

For interworking with an integrated services digital network (ISDN) the bearer control point is connected to the ISDN by a multiplex 33 comprising:

a voice and data link 31 which can be connected temporarily to the links 1, 25; and a call and bearer control signalling link 32 of the CCITT N° 7 ISUP type terminating at a signalling point SP5 of the bearer control point.

The bearer control point then has an integrated services digital network interface enabling it to access the conventional services of an intelligent network or a mobile radio network such as those described in French patent application n° 2 638 307. This interface can be used to implement a hybrid ISDN/separate call control and bearer control network enabling existing networks to evolve progressively.

The bearer control point provides access to the services that may be processed at local/regional level by the call and service control point or at the national level by an external services server. These services use data stored in files which are either local/regional and therefore internal to the call and service control point or national and therefore in permanent or temporary external files.

A service for translating emergency service numbers (15, 17, 18 in France, for example) is processed at the local or regional level by the call and service control point and using local files in the call and service control point. A mobile radio service, on the other hand, is processed at the local/regional level by the call and service control point but using permanent and temporary data concerning subscribers which is centralized at national level in external files. In the latter case the external files/call and service control point interface is of the IN or MAP type, i.e. it comprises a set of operations on transactional protocols such as the TCAP protocol standardized by the CCITT.

In an alternative embodiment a call and service control point may be connected to a plurality of bearer control points.

There is claimed:

1. A telecommunication network in which call control and connection control are separated, the telecommunication network comprising switching nodes each comprising:

- a call and service control point implementing all signalling functions relating to call control and service control including call set-up, supervision and clearing down and performing said signalling functions for at least one service requested during said call; and
- a bearer control point connected to said call and service control point and implementing only switching functions and signalling functions relating to connection control including bearer set-up, supervision and clearing down;
- wherein said bearer control point is connected to said call and service control point by a link using a standard intelligent network interface enriched by parameters relating to connections requested by said call and service control point.

2. The telecommunication network according to claim 1, where said call and service control point and said bearer control point are connected to an operation and maintenance center for performing operation and maintenance functions concerning calls and services including charging and to bearer resources deployed.

3. The telecommunication network according to claim 1, wherein each of said switching nodes comprises an interface to an integrated services digital network to provide a hybrid network including an integrated services digital network with separate call control and connection control.

4. A telecommunication network in which call control and connection control are separated, the telecommunication network comprising switching nodes each comprising:

- a call and service control point implementing all signalling functions relating to call control and service control including call set-up, supervision and clearing down and performing said signalling functions for at least one service requested during said call; and
- a bearer control point connected to said call and service control point and implementing only switching functions and signalling functions relating to connection control including bearer set-up, supervision and clearing down;
- wherein said call and service control point is connected to a plurality of bearer control points.

* * * * *